United States Patent
Poglitsch et al.

(10) Patent No.: US 11,776,148 B1
(45) Date of Patent: Oct. 3, 2023

(54) MULTI-VIEW HEIGHT ESTIMATION FROM SATELLITE IMAGES

(71) Applicant: Blackshark.ai GmbH, Graz (AT)

(72) Inventors: Christian Poglitsch, Graz (AT); Thomas Holzmann, Graz (AT); Stefan Habenschuss, Graz (AT); Christian Pirchheim, Graz (AT); Shabab Bazrafkan, Graz (AT)

(73) Assignee: Blackshark.ai GmbH, Graz (AT)

( * ) Notice: Subject to any disclaimer, the term of this patent is extended or adjusted under 35 U.S.C. 154(b) by 0 days.

(21) Appl. No.: 18/107,378

(22) Filed: Feb. 8, 2023

Related U.S. Application Data (60) Provisional application No. 63/330,433, filed on Apr. 13, 2022.

(51) Int. Cl.
*G06T 7/60* (2017.01)
*G06T 7/33* (2017.01)
*G06T 7/55* (2017.01)

(52) U.S. Cl.
CPC ............... *G06T 7/60* (2013.01); *G06T 7/33* (2017.01); *G06T 7/55* (2017.01); *G06T 2207/10032* (2013.01); *G06T 2207/30184* (2013.01)

(58) Field of Classification Search
CPC .... G06T 7/60; G06T 7/33; G06T 7/55; G06T 2207/10032; G06T 2207/30184
See application file for complete search history.

(56) References Cited

U.S. PATENT DOCUMENTS

2002/0061132 A1* 5/2002 Furukawa ............... G06V 20/13
348/E13.064

OTHER PUBLICATIONS

Epipolar geometry, Owens, 1997; https://homepages.inf.ed.ac.uk/rbf/CVonline/LOCAL_COPIES/OWENS/LECT10/node3.html#:~:text=The%20epipolar%20line%20is%20the,lines%20intersect%20at%20the%20epipole. (Year: 1997).*
Sat Imaging Direction Angles Est, Yi et al, 2020; https://isprs-archives.copernicus.org/articles/XLIII-B2-2020/527/2020/isprs-archives-XLIII-B2-2020-527-2020.pdf (Year: 2020).*
Bosch et al., "A Multiple View Stereo Benchmark for Satellite Imagery", Conference Paper, The Johns Hopkins University Applied Physics Laboratory, DOI: 10.1109/AIPR.2016.8010543, Oct. 2016, 10 pages.

(Continued)

*Primary Examiner* — Jianxun Yang
(74) *Attorney, Agent, or Firm* — Beyer Law Group LLP (57) ABSTRACT

Computing a height of a building is performed by inputting a pair of two-dimensional (2-D) aerial images of a city along with their metadata. Using the metadata, a three-dimensional (3-D) vector from each image toward the location of the camera when each image was taken is determined. A plurality of pairs of corresponding image points from the images are computed, in each pair of image points an image point of one image identifies the same physical point on the building as the second image point of the second image. Next, the images are superimposed, and for each pair of image points, determine the intersection of the 3-D vector of the first image originating at the first image point with the 3-D vector of the second image originating at the second image point. Each intersection is a 3-D position and the height is determined from the median of these 3-D positions.

32 Claims, 7 Drawing Sheets

(56) References Cited

OTHER PUBLICATIONS

DeTone et al., "SuperPoint: Self-Supervised Interest Point Detection and Description", https://openaccess.thecvf.com/content_cvpr_2018_workshops/papers/w9/DeTone_SuperPoint_Self-Supervised_Interest_CVPR_2018_paper.pdf , IEEE, 2018, p. 337-349.

Liu et al., "IM2ELEVATION: Building Height Estimation from Single-View Aerial Imagery", Remote Sens., www.mdpi.com/journal/remotesensing, Aug. 2020, 12, 2719; doi:10.3390/rs12172719, 22 pages.

Paul et al., "A Comprehensive Review on Remote Sensing Image Registration", International Journal of Remote Sensing, 42:14, 5396-5432, DOI: 10.1080/01431161.2021.1906985, https://doi.org/10.1080/01431161.2021.1906985, Apr. 30, 2021, 38 pages.

Perko et al., "Very High Resolution Mapping with the Pleiades Satellite Consellation", American Journal of Remote Sensing, vol. 6, No. 2, 2018, pp. 89-99. doi: 10.11648/j.ajrs.20180602.14, Dec. 24, 2018, 11 pages.

Sarlin et al., "SuperGlue: Learning Feature Matching with Graph Neural Networks", https://openaccess.thecvf.com/content_CVPR_2020/papers/Sarlin_SuperGlue_Learning_Feature_Matching_With_Graph_Neural_Networks_CVPR_2020_paper.pdf , IEEE, 2020, p. 4938-4947.

Xie et al., "Multi-Scene Building Height Estimation Method Based on Shadow in High Resolution Imagery", Remote Sens. 2021, 13, 2862. https://doi.org/10.3390/rs13152862, https://www.mdpi.com/journal/remotesensing, 18 pages, Jul. 21, 2021.

Zhao et al., "A 3D Reconstruction Framework of Buildings Using Single Off-Nadir Satellite Image", Remote Sens. 2021, 13, 4434. https://doi.org/10.3390/rs13214434, https://www.mdpi.com/journal/remotesensing, 20 pages, Nov. 4, 2021.

Clemons, "SIFT: Scale Invariant Feature Transform by David Lowe", Oral Presentation, 2009, 39 pages.

\* cited by examiner

3-D Building Reconstruction

Corresponding Points of an Image Pair

MULTI-VIEW HEIGHT ESTIMATION FROM SATELLITE IMAGES

CROSS-REFERENCE TO RELATED APPLICATIONS

This application claims priority of U.S. provisional patent application No. 63/330,433, filed Apr. 13, 2022, entitled "MULTI-VIEW HEIGHT ESTIMATION FROM SATELLITE IMAGES," which is hereby incorporated by reference.

FIELD OF THE INVENTION

The present invention relates generally to satellite imagery and rendering of objects on earth. More specifically, the present invention relates to height estimation of objects.

BACKGROUND OF THE INVENTION

Height information of objects on earth is a key feature required for many urban geographic applications, including navigation or city planning, and more generally visualization.

Current methods to estimate heights from satellite images can be divided into three categories, each having particular disadvantages. The first category requires images from calibrated cameras of the same region to perform a 3-D reconstruction of the scene. For example, for projecting points from the image space into the real-world space a calibrated camera is required as in Bosch and Perko. This is disadvantageous because one must be able to communicate with the satellite and calibrate its camera or receive calibration data. In many situations all that is available are images and minimal metadata; there is no way to communicate with the satellite beforehand to calibrate its camera nor to receive the calibration data.

For the second category, shadows of objects like buildings are used to compute the height of the corresponding building as in Xie. In this case the building height is computed based upon the length of the shadow of the buildings using azimuth of the sun and azimuth of the camera. This method is disadvantageous since it is error prone for complex building shadows or for shadow lengths on complex ground and other structures, and relies upon images photographed during sunlight. Further, shadows can be hard to detect where multiple high rises exist.

The third category of methods relies on neural networks as in Zhao and Liu. For this case height values are learned from existing data. Relying upon neural networks, machine learning and existing data is challenging because accurate ground truth data is needed and the results simply indicate "low" or "high" buildings rather than accurate heights.

Therefore, what is needed is an accurate technique and system for estimating heights of objects, structures and buildings on the earth based upon satellite images, which does not require camera calibration, does not rely upon shadows, nor requires ground truth data nor machine learning from existing data.

SUMMARY OF THE INVENTION

To achieve the foregoing, and in accordance with the purpose of the present invention, a system and technique are disclosed that estimates heights of objects in satellite images using minimal metadata.

The present invention presents a framework for height estimation from readily-available satellite image pairs. We propose a general approach that is suitable for all objects above ground. For the example embodiment herein, we show the application for estimating heights for buildings. The invention estimates heights from a generic image pair with potentially different timestamps requiring only a few available camera parameters (metadata per image), namely azimuth, off-nadir angle (ONA) and ground sampling distance (GSD) as additional input parameters, and requires no ground truth data.

Advantageously, the framework is designed for large-scale processing, to enable building height estimation and reconstruction of buildings on a global scale. Unlike the prior art, no camera calibration is required and instead we exploit minimal metadata in order to reconstruct 3-D points from 2-D images. Further, reliance upon shadows is not necessary, no existing data is required, such as ground truth data, and it is not necessary to train a neural network.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figures 1, 2A, 2B:
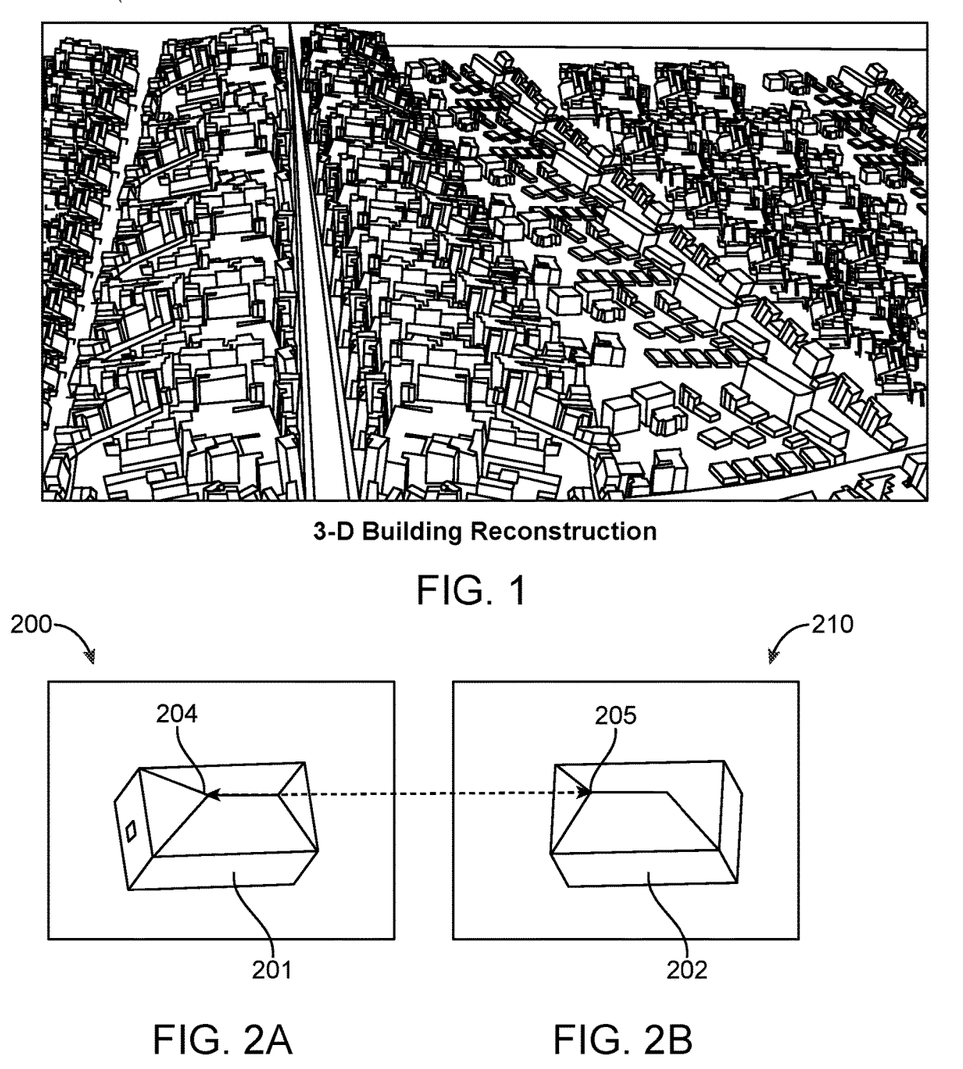
FIG. 1 illustrates a typical city scene having multiple buildings and other objects above ground, and shows the applicability of the invention to large-scale building height reconstruction.
FIGS. 2A and 2B shows corresponding image points detected in an image pair.

FIG. 1 illustrates a typical city scene 100 having multiple buildings and other objects above ground and shows the applicability of the invention to large-scale building height reconstruction. Shown are any number of buildings and other structures that have been reconstructed from satellite images using an estimated height as will be herein described. The invention may be used with a variety of geographic software applications such as navigation, city planning, visualization, etc., and may be used to estimate the height of buildings (or other objects) in order to render the building with an accurate height in a 3-D software model, application, or other rendering on a computer screen. In particular, given 2-D footprint polygons of buildings along with an estimated height for each building, a process of extrusion is used to produce the 3-D geometry as shown in FIG. 2. The geometry data may be visualized in any 3-D viewer such as the Unreal Engine or Unity Engine.

The novelty of our approach is to reconstruct 3-D structures above ground level—such as the heights of buildings—given pairs of spatially overlapping and geo-referenced 2-D satellite images as well as a limited set of meta-information for each image, namely the azimuth and off-nadir angles which define a ray from ground to the position of the satellite at the time of image acquisition. An image is a 2-D matrix and every entry in the matrix is referred to as pixel. Projection is the mapping between pixels in the 2-D image space and the 3-D world space which is represented by a geographic coordinate system.

FIGS. 2A and 2B show corresponding image points detected from a pair of corresponding satellite images. Shown is the same structure (in the simple example, a small building) in 2-D images 201 and 202 taken from different perspectives by a satellite. Points 204 and 205 in the images are the same physical point on the structure. For example, the corner 204 of the building roof from image 201 is found in the other image 202 at 205, although shown from a different perspective. Although typically the same satellite will photograph a region on earth from different perspectives (and will thus photograph the same structure from different perspectives), it is contemplated that the two images may come from two different satellites photographing the same region at the same or at different times—in the latter case the two images may also come from the same satellite. Further, it is not strictly necessary that the images are satellite images; the images may be taken from any suitable high-altitude platform such as airplanes, drones, balloons, etc.

And, it is not necessary that the two images contain the exact same region on earth. We assume that the two input images (1) overlap, that is each image partially shows the same region on earth, and (2) show the earth from different perspectives, that is the spatial 3-D position of the recording platform (e.g., the camera(s), the satellite(s)) are not equal at the time of image acquisition since we require distinct azimuth and/or off-nadir angles. Typically, the input images are registered and geo-referenced, that is the images are aligned in a common geographic reference coordinate reference system and are thus implicitly aligned such that pixels which depict ground structures of the earth (i.e., structures that have a relative height of zero with respect to ground) overlap in the two images. The registration and geo-referencing of images is usually performed by the image provider and can thus be assumed as given.

Given that we know the diverging locations of pairs of corresponding image pixels in both images that belong to above-ground structure, we compute their true 3-D locations by utilizing the available metadata. Corresponding image points are pixel coordinates for both images where a pixel in one image can be identified as the same point in the other image. Computation of a true 3-D location for each pair of image points yields a dense point cloud above structures, i.e., in case of the structure being a building, its corresponding reconstructed 3-D point cloud can be assigned to its 2-D footprint and thus its height can be determined.

System Overview

Figure 3:
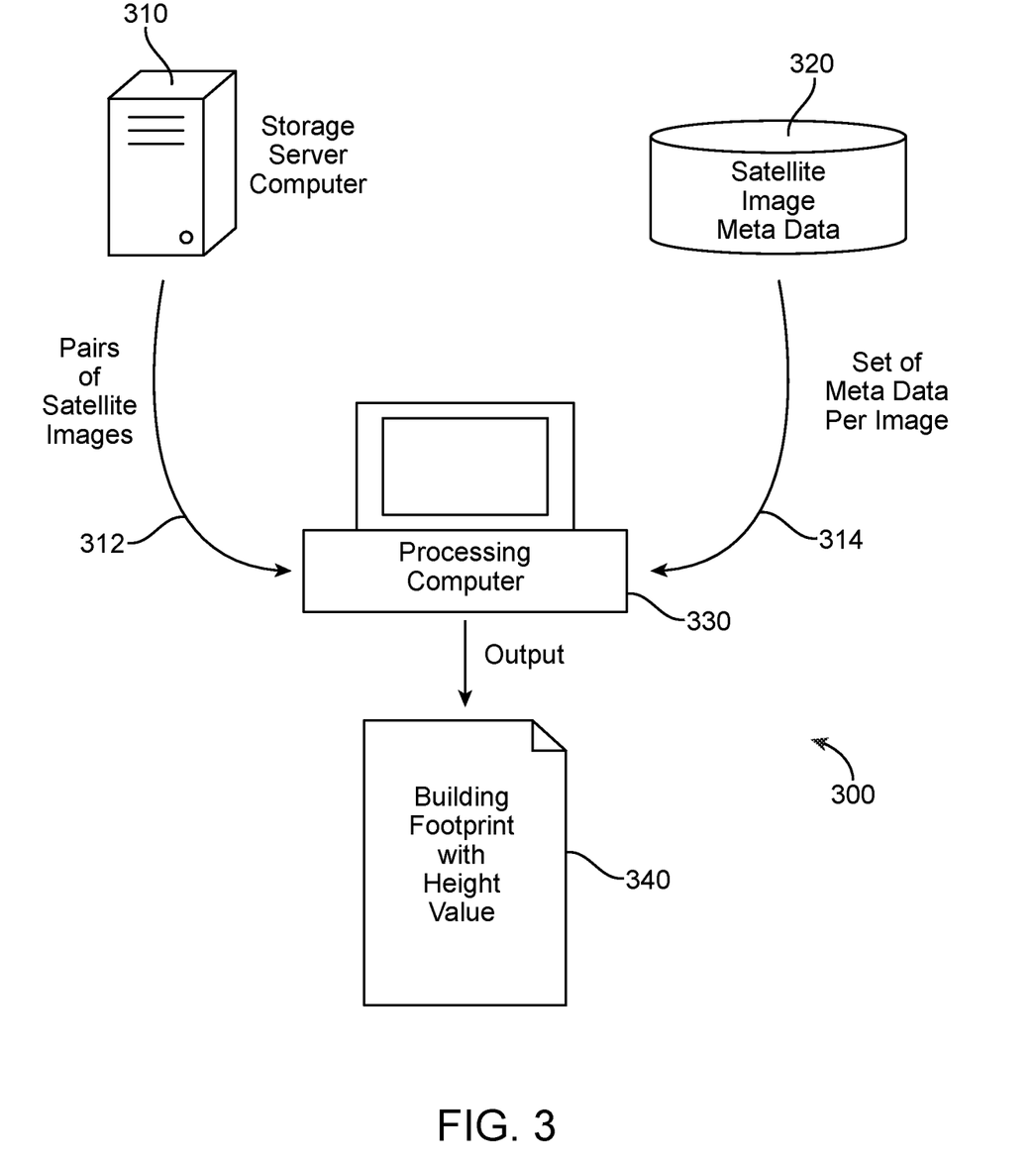
FIG. 3 illustrates one embodiment of a system for implementing the present invention.

FIG. 3 illustrates one embodiment of a system for implementing the present invention. Shown is a storage server computer 310 which is the place (local or remote) where data is stored such as image files. Satellite images may be stored as raster files or in any other suitable format. Computer 310 may include internal or external databases.

Database 320 includes the metadata for each satellite image and this database may be remote from computer 310 or more may be stored in conjunction with computer 310. The respective metadata for each satellite image includes an image identifier, azimuth angle, off-nadir angle (ONA) and ground sampling distance.

Processing computer 330 is any suitable computer system (local or remote) where the data is processed. The pairs of satellite images and their corresponding metadata may be processed automatically with no manual intervention. Typically, the input parameters to the processing computer include the paths to the image acquisition and the metadata. Output from the processing computer 330 is a building footprint along with a height value 340. Preferably, the output is any number of geo-referenced building footprints each with their respective height value. The output may be in any form such as on paper, output to a computer screen, output to a computer database, output to a computer application such as computer vision, 3-D reconstruction, geospatial analysis, remote sensing, etc. In one particular embodiment, the output takes the form of a vector file including building footprints along with a height value for each footprint.

Flow Diagram

Figure 4:
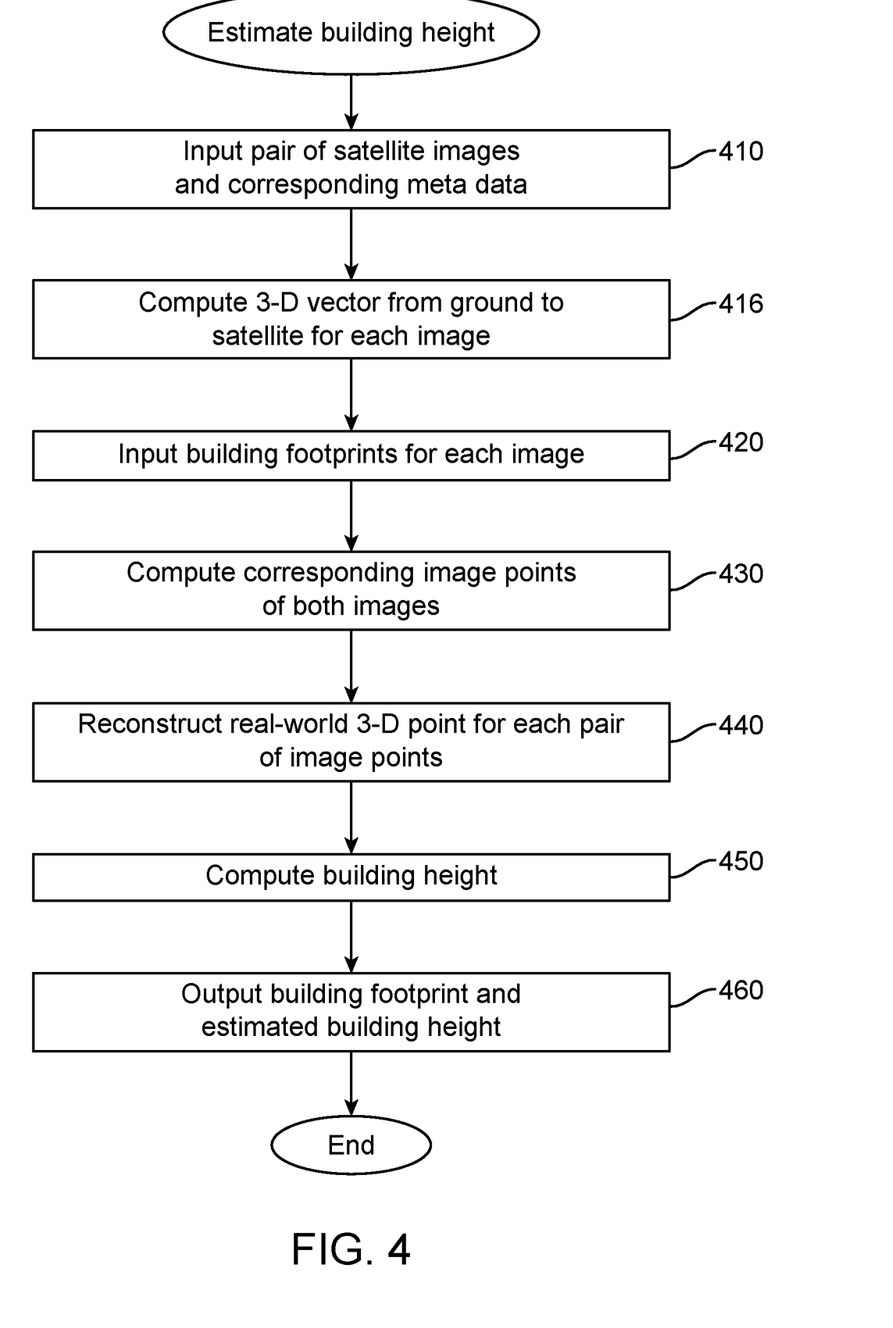
FIG. 4 is a flow diagram describing how the height of a building (or buildings) may be estimated using satellite images.

FIG. 4 is a flow diagram describing how the height of a building (or buildings) may be estimated using satellite images. In step 410 a pair of satellite images and their corresponding metadata is retrieved from a storage computer and input into the processing computer. As shown in FIGS. 2A and 2B, the two satellite images show a region on the earth (including any number of structures) from different perspectives. These satellite images are provided from external sources, such as from storage server computer 310. The images are geo-referenced which means that a pixel in an image can be related to a position on earth. These images are presented as raster data in several possible formats, for example in GeoTIFF. Each image will show at least one structure (such as the structure shown in images 201 and 202) which is the same structure in each image except from a different perspective. To reconstruct its height, each structure of interest should be represented by at least one pixel in each image. Overall, however, each image may show a single building, portions of, or entire, towns and cities having many hundreds or thousands of buildings and other structures. Also input from the external source is a set of metadata for each image, including an azimuth angle, an off-nadir angle and a ground-sampling distance. Both the azimuth angle and the off-nadir angle are the angles from the location of the image on earth to the satellite at the moment that the pixels of the image were sensed. The ground-sampling distance is the physical size of a pixel in the real world for a particular image and is used below to calculate height of a building.

In practice, azimuth and off-nadir angles may vary for each image pixel, depending on how the imaging process was carried out. Whether a single azimuth/off-nadir angle pair applies to the entire image essentially depends on (1) whether the camera was moving during the imaging process or not and (2) how the employed camera optics and sensor can be modeled mathematically/geometrically (e.g., perspective vs. orthographic camera model). In the case of satellite images, the angles usually vary because the recording of an image—typically using a tiltable pushbroom camera modeled as orthographic camera—usually takes several seconds while the satellite (and thus the camera sensor) is moving along its orbit. Thus, in practice, when we are processing satellite images, we are retrieving a separate azimuth/off-nadir angle pair for each image pixel from the metadata. The actual azimuth/off-nadir angle pair used to calculate the 3-D vector below for an image may be any pair from the image, may be a pair associated with an image pixel from the structure in question, or may be a pair from an image pixel at about the center of the structure, with increasing accuracy as these respective pairs are used.

The below exemplary steps describe how height is estimated for a particular structure such as a building, although in a preferred embodiment the steps below are executed in parallel for any number of buildings in order to output any number of building footprints and their estimated building heights in the final step. For ease of explanation, though, the following steps give an example using a single building.

In a next step 416, a 3-D vector from the ground position of the image to the satellite when the image was taken is computed for each image in the pair of images. The below figures illustrate how such a 3-D vector for each image may be computed using the angles from the metadata. As mentioned above, when processing satellite images, it is possible to retrieve a different azimuth/off-nadir angle pair for each image pixel from the metadata of the image, resulting in a different 3-D vector for each pixel of an image. Preferably, the 3-D vector for each image is calculated using an azimuth/off-nadir angle pair from an image pixel of about the location of the structure, more preferably using an image pixel from the structure, and even more preferably using an image pixel from about the center of the structure.

Figure 5:
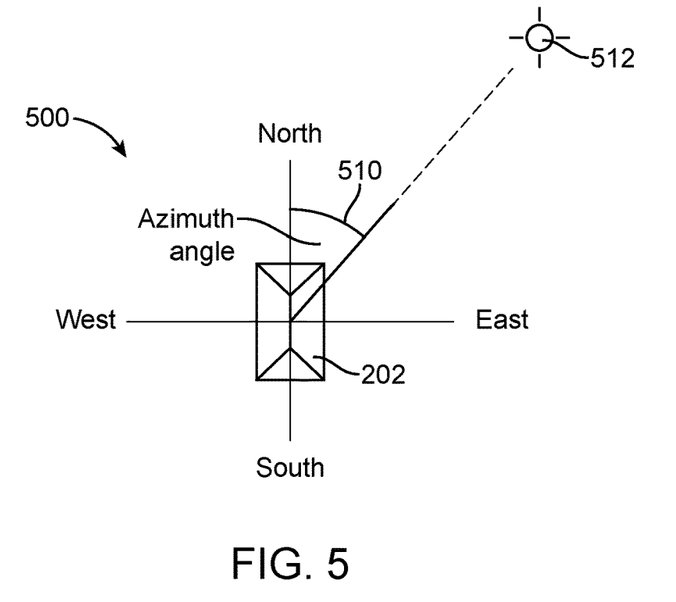
FIG. 5 illustrates an azimuth angle 510 for an image 202 of the structure.

FIG. 5 illustrates an azimuth angle 510 for an image 202 of the structure. The azimuth angle from the image metadata is the horizontal direction to the satellite 512. For example, an azimuth of zero indicates that the satellite is directly north of the ground position of the structure shown in image 202. Similarly, if the satellite 512 is directly east of the structure when the image is taken (and it may be at any altitude) than the azimuth angle 510 would be 90°.

Figure 6:
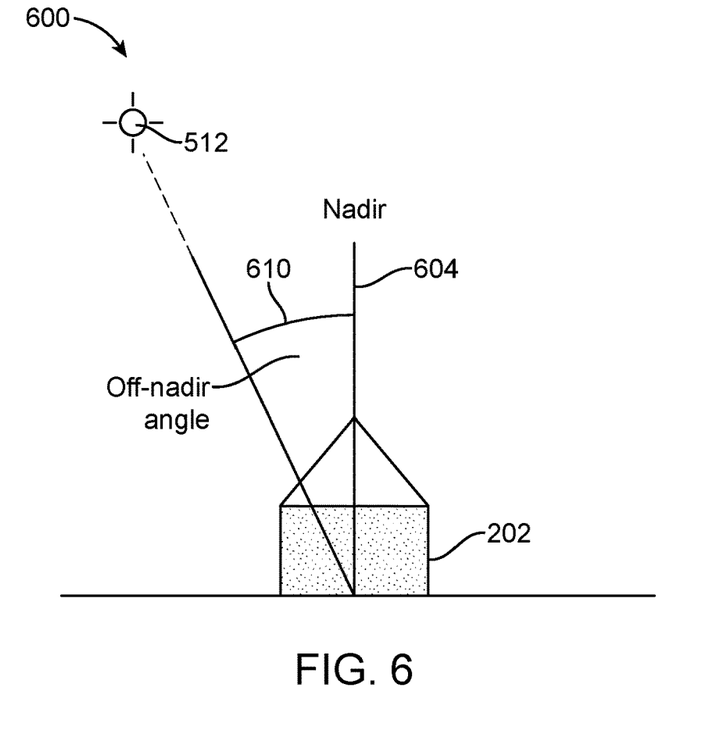
FIG. 6 illustrates an off-nadir angle 610 for the image 202 of the structure.

FIG. 6 illustrates an off-nadir angle 610 for the image 202 of the structure. The off-nadir angle 610 from the metadata is the vertical direction to the satellite. For example, an off-nadir angle of 0° indicates that the satellite is directly above the ground position of the structure when the image is taken. For a given off-nadir angle, the satellite may be at any particular azimuth angle in relation to the structure.

Figure 7:
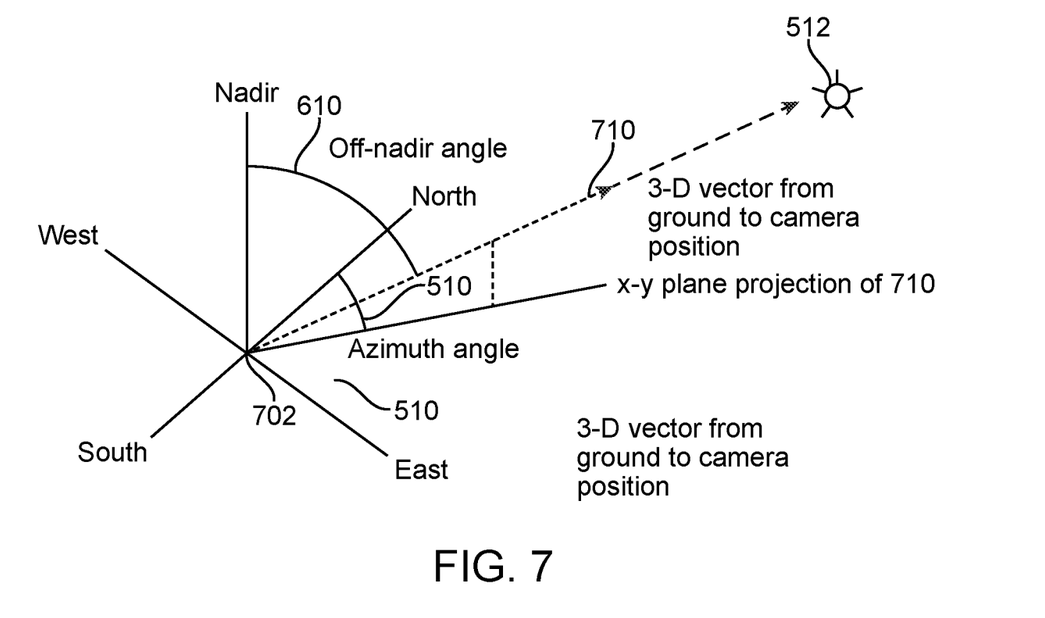
FIG. 7 illustrates how the azimuth angle and the off-nadir angle from a particular image are combined to produce a 3-D vector from the ground position of the image to the camera position of the satellite for that particular image.

FIG. 7 illustrates how the azimuth angle and the off-nadir angle from a particular image are combined to produce a 3-D vector from the ground position of the image to the camera position of the satellite for that particular image. The origin 702 represents the ground position of the image in question, the off-nadir angle 610 and the azimuth angle 510 are as described above, and the combination of the two is shown as vector 710. (The azimuth angle is shown using a projection of vector 710 onto the x-y plane, i.e., the plane of the Earth.) Such a vector 710 is computed for each of the image pairs. Generally, the origin 702 may be any pixel of an image for which we can retrieve an azimuth/off-nadir angle pair from the metadata.

Next, in step 420 vectorized building footprints for each image are input. These footprints are 2-D geo-referenced information that indicate which part of the image is a building. Vectorized data are shapes such as rectangles in the same coordinate system as the geo-referenced satellite image pairs. There are several file formats for vectorized data like GeoJson and Shapefiles. This input is used to detect specific objects like buildings. The input may occur at any time, but preferably no later than step 450 in which a height of the structure is computed.

Next, in step 430 corresponding pairs of image points are computed from both images. As shown in FIGS. 2A and 2B, a single physical point on a structure is represented by a pair of image points 204 and 205 each from one of the image pairs. Any number of these pairs of image points may be computed, each pair of image points representing a single physical point on the structure. Typically, corresponding pairs of image points are computed for physical points on the roof or top of the structure. Any suitable method may be used to find these corresponding image points such as the scale-invariant feature transform (SIFT) described in "*SIFT—The scale invariant feature transform*," by Lowe, G., Int. J. 2. 91-110 (2004), or a machine learning approach such as the combination of Super Point, "*Super Point: Self Supervised Interest Point Detection and Description*," (2017) and SuperGlue, "*SuperGlue: Learning Feature Matching with Graphs Neural Networks*," by Sarlin, Paul-Edouard & DeTone, Daniel & Malisiewicz, Tomasz & Rabinovich, Andrew (2020) 4937-4946. 10.1109/CVPR42600.2020.00499.

In one particular embodiment, corresponding image points are computed over the entire image, meaning that for each pixel in one of the images its corresponding image point is computed in the other image. Of course, other approaches may only compute image points for certain regions of an image, for certain structures, only for building footprints, etc. And, corresponding image points may be computed for points larger than a pixel. Once all of the image points are computed and the building footprints considered, then only the computed image points within a building footprint are considered for a height estimation in the next steps.

Once these pairs of corresponding image points have been computed, then in step 440 a real-world 3-D point is reconstructed for each pair of these image points (or for only those points corresponding to a footprint in an optimization). In this step the real 3-D world position of each pair of corresponding images points is computed. For each pixel, we retrieve the 3-D vector for each image (given by azimuth and off-nadir angles) of its source satellite, as described above in step 420. This gives us two 3-D rays each originating from the geo-referenced pixel location in the corresponding image and directed towards the associated 3-D satellite image capture location (i.e., the location of the satellite when it photographed each image). Thus, for an off-ground pixel pair, the intersection of these 3-D vectors results in a geo-referenced 3-D world point. This technique is applied for all image points considered and the result is a dense point cloud with geo-referenced 3-D points.

Although it is possible to reconstruct a 3-D world point for every pixel pair from the images, in general that is not necessary. For the use case of building height estimation, at least one 3-D world point that is located over the corresponding footprint is reconstructed. Overall, one can include or exclude any image region to/from 3-D reconstruction, depending on the concrete use case.

Figure 8:
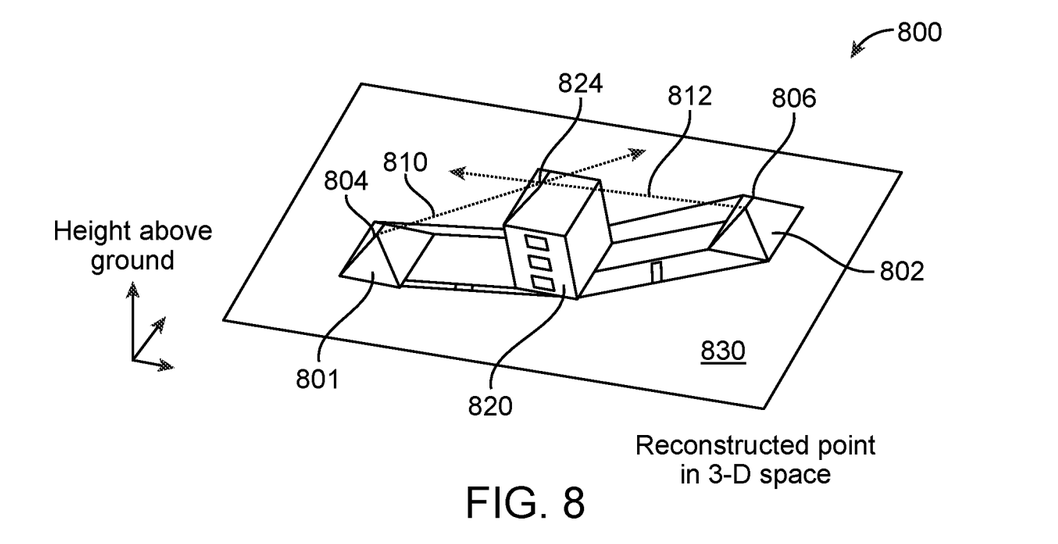
FIG. 8 illustrates reconstructing a real-world point in 3-D space using the 3-D vectors from the two images.

This technique can be visualized using FIGS. 2A, 2B and FIG. 8. In image 201 the building has been photographed roughly from its front and left-hand side (the roof including point 204 thus appearing to be farther to the right than it is in reality), while in image 202 the same building has been photographed roughly from its front and right-hand side (point 205 thus appearing farther to the left than it actually is). The images are superimposed in order to perform this step. Thus, when image 202 is superimposed over image 201, point 205 is located on the ground plane farther to the left of point 204. When the 3-D vector for image 201 is drawn originating from point 204 it will be directed to the front and left (in the direction of where the satellite was when it took the photograph of image 201); when the 3-D vector for image 202 is drawn originating from image point 206 it will be directed to the front and right (in the direction of where the satellite was when it took the photograph of image 202). Mathematically, these two 3-D vectors will intersect at a point which is the real-world 3-D point for this pair of image points. In practice, the two 3-D vectors will typically have no exact intersect point in space because of, e.g., noise and errors in the measurements of image pixels and azimuth/off-nadir angles, etc. But the two 3-D vectors typically nearly intersect and the 3-D point of intersection is approximated.

FIG. 8 illustrates reconstructing a real-world point in 3-D space using the 3-D vectors from the two images. Two different images of the same structure 820 from two different satellite positions (or from two different satellites) have been aligned and superimposed over one another on a ground plane 830 resulting in a projected roofprint 801 and a projected roofprint 802 from the building 820 onto ground plane 830; i.e., the images are mapped onto the same plane. The projections of the building are shown somewhat exaggerated in order to illustrate this example and the building 820 itself is shown in the drawing, although in an actual projection it would not appear as shown. Since the footprint of the building is geo-referenced it will have the same position in each image. As shown, roofprint 801 is from an image taken from a camera which was roughly up and to the right of the building when the image was taken, and roofprint 802 is from an image taken from a camera (which may have been the same camera or different cameras) which was roughly up and to the left of the building when the image was taken. As shown, the pixel locations 804 and 806 represent the same physical point in each of the images 200 and 210. The two 3-D vectors are shown at 810 and 812 and they intersect at point 824. This figure shows the projection of the building 820 onto a ground plane 830 from different camera positions. Due to different viewing angles the roofprints 801 and 802 will be projected onto different regions of the image planes. This effect depends upon the height of the building, the off-nadir angle, and the azimuth angle. For higher buildings or increased angles, the effect of the distortion increases. The intersection of the corresponding pair of rays 810, 812 (or, 3-D vectors) pointing from ground to camera position results in the 3-D world point 824.

Figure 9:
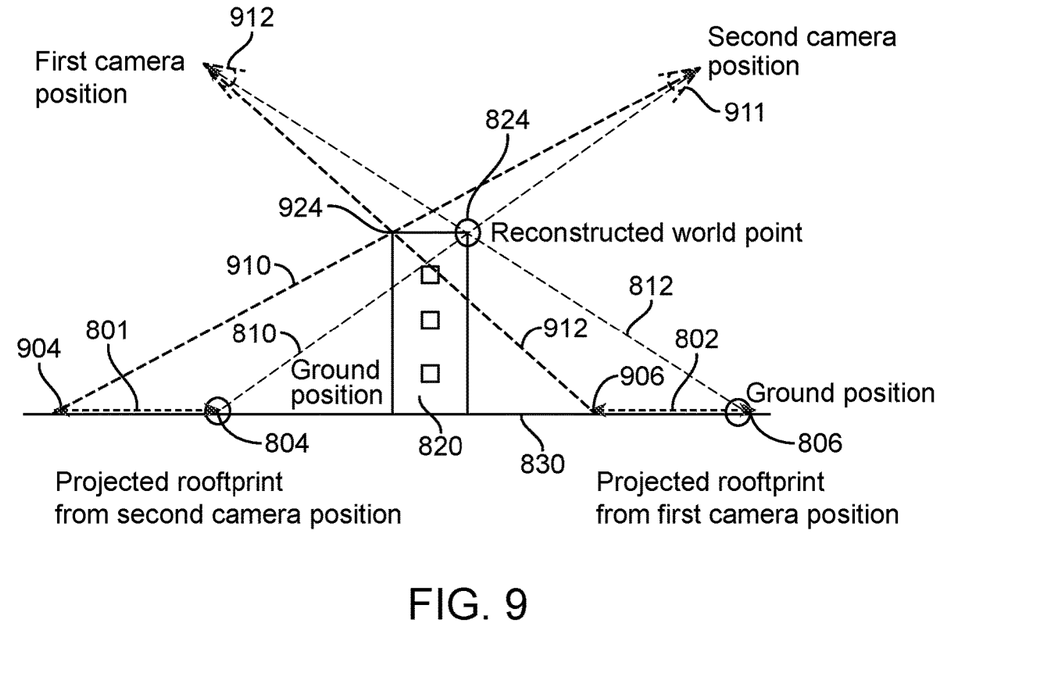
FIG. 9 illustrates the example of FIG. 8 from a different perspective.

FIG. 9 illustrates the example of FIG. 8 from a different perspective. Shown is building 820 which has been photographed from two different camera positions 911 and 912 resulting in two different images, the image from the first camera position 912 including projected roofprint 802 and the image from the second camera position 911 including projected roofprint 801. The images are superimposed onto a ground plane 830 and once the 3-D vectors 810 and 812 are drawn from their respective ground position points 804 and 806 (representing the same physical point on the roof of the building) they intersect at point 824 which is the reconstructed 3-D world point. Such reconstruction of world points on the roof of the structure may be performed for any number of image pixel pairs. Accordingly, taking image pixels 904 and 906 (representing another same physical point on the roof of the building) and drawing the corresponding 3-D vectors 910, 912 for each of the images these vectors intersect at point 924 which is the reconstructed 3-D world point for another corner of the roof of the building. Reconstructing a plurality of these world points for the roof results in a dense point cloud corresponding to pairs of image pixels. As shown, each of these world points has a particular height above the ground plane.

In a next step 450 the structure height is computed for each building footprint using the dense point cloud from step 440. Corresponding image points with the exact same pixel coordinates in both input images have a height value of zero, e.g., streets. For objects above ground the intersection of both 3-D vectors is their respective height value. Height values need only be computed for areas covered by building footprints, and makes use of the building footprint information input in step 420. In one particular embodiment, a robust height estimation of a structure is the median value of all reconstructed 3-D world positions that are covered by a footprint of the structure. This median value is then multiplied by the ground-sampling distance to obtain an actual height value for the structure in feet or meters.

In the next step 460 the building footprint is output along with its estimated building height. The output may be a 2-D geo-referenced set of building footprints and each footprint will have an estimated building height.

Computer System Embodiment

Figure 10A:
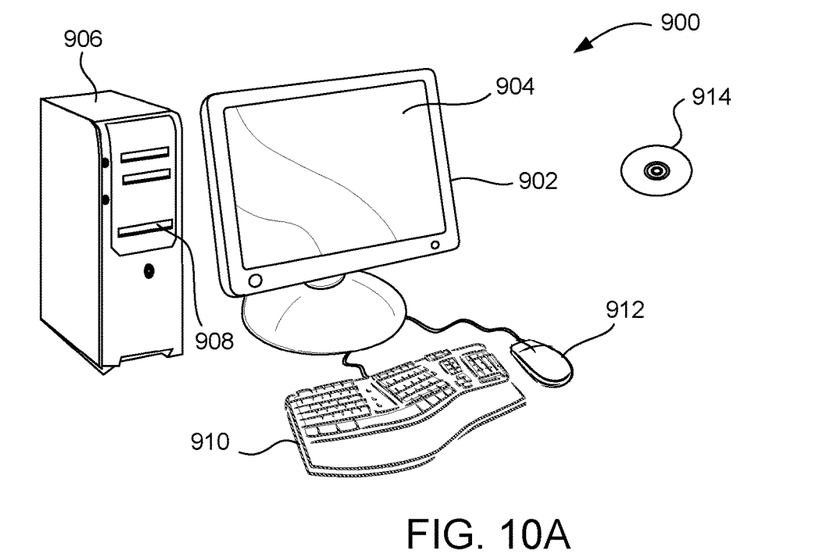
FIGS. 10A and 10B illustrate a computer system suitable for implementing embodiments of the present invention.
Figure 10B:
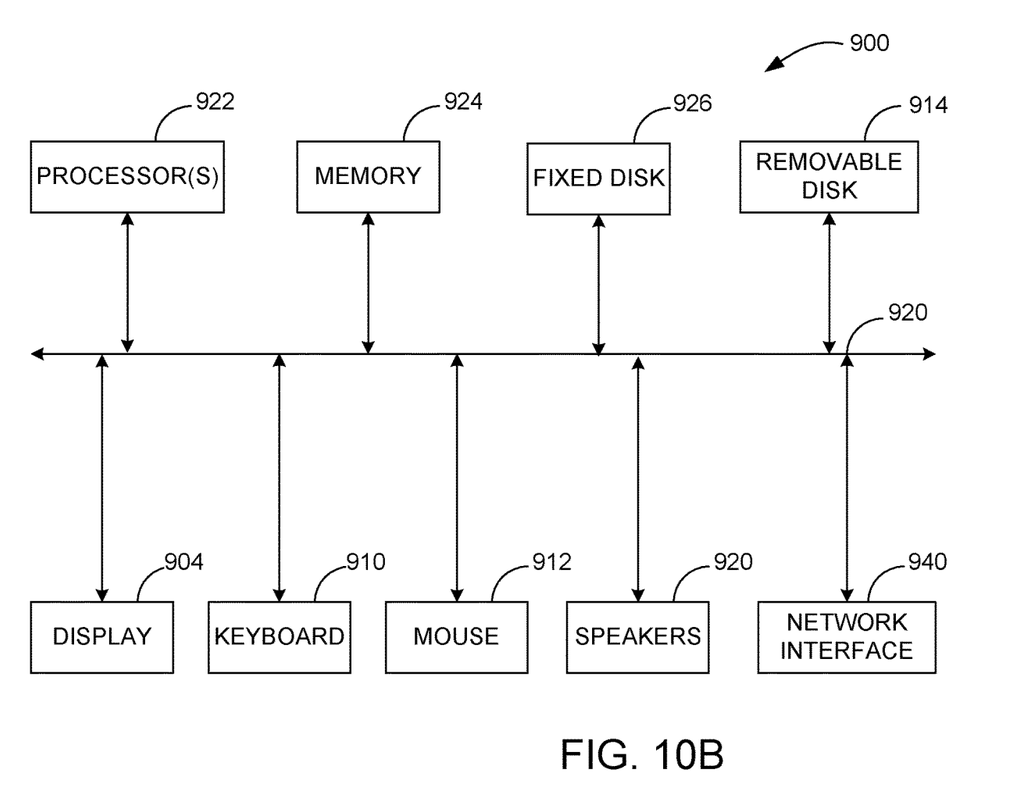

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of computing a height of a structure, said method comprising:
   inputting a pair of first and second two-dimensional (2-D) aerial images taken from a camera from different perspectives along with metadata for each image, each image including at least said structure;
   for each image, computing, using said metadata, a three-dimensional (3-D) vector from a geo-referenced location of said each image on a ground plane of the Earth toward the location of said camera when said each image was taken with said camera;
   computing a plurality of pairs of coordinates of corresponding first and second image points from said geo-referenced locations of said images, wherein in each pair of image points a first image point of said first image identifies the same physical point on said structure as a second image point of said second image;
   for each pair of image points, determining the intersection of said 3-D vector of said first image originating at the coordinates of said first image point with said 3-D vector of said second image originating at the coordinates of said second image point, wherein said each intersection being a 3-D position; and
   determining said height by taking a median of said 3-D positions and outputting said height of said structure based upon said 3-D positions.

2. A method as recited in claim 1, further comprising:
   computing said height of said structure using only a ground-sampling distance, an azimuth angle and an off-nadir angle from said metadata of said each image.

3. A method as recited in claim 2 wherein said metadata does not include calibration data of said camera.

4. A method as recited in claim 1 wherein said camera is located in a satellite, in an aircraft, in a drone, or in a balloon.

5. A method as recited in claim 1 wherein said first image is taken with a first camera and said second image is taken with a second camera.

6. A method as recited in claim 1, further comprising:
   determining said height by multiplying said median by a ground-sampling distance of said metadata.

7. A method as recited in claim 6, further comprising:
   computing said height using only said ground-sampling distance, an azimuth angle and an off-nadir angle from said metadata of said each image.

8. A method as recited in claim 7 wherein said metadata does not include calibration data of said camera.

9. A method as recited in claim 1, further comprising:
   determining the intersection of said 3-D vector only for those pairs of images points that correspond to a building footprint of said structure.

10. A method as recited in claim 1, further comprising:
    performing said steps of claim 1 for a plurality of structures in said images.

11. A method as recited in claim 1, further comprising:
    computing said plurality of pairs of coordinates of corresponding image points for all pixels in said images.

12. A method as recited in claim 1 wherein said metadata does not include calibration data of said camera, said method further comprising:
    computing said height of said structure without using said calibration data.

13. A method as recited in claim 12 wherein said metadata only includes a ground-sampling distance, an azimuth angle and an off-nadir angle for said each image.

14. A method as recited in claim 1 wherein each of said images includes the same region on earth.

15. A method as recited in claim 1 wherein said first and second images overlap.

16. A method as recited in claim 1 further comprising:
    computing said three-dimensional (3-D) vector for said each image using metadata from an image pixel of said structure in said each image.

17. A system for computing a height of a structure, said system comprising:
    a processing computer configured to
      input a pair of first and second two-dimensional (2-D) aerial images taken from a camera from different perspectives along with metadata for each image, each image including at least said structure;
      compute, for each image, using said metadata, a three-dimensional (3-D) vector from a geo-referenced location of said each image on a ground plane of the Earth toward d the location of said camera when said each image was taken with said camera;
      compute a plurality of pairs of coordinates of corresponding first and second image points from said geo-referenced locations of said images, wherein in each pair of image points a first image point of said first image identifies the same physical point on said structure as a second image point of said second image;
      for each pair of image points, determine the intersection of said 3-D vector of said first image originating at the coordinates of said first image point with said 3-D vector of said second image originating at the coordinates of said second image point, wherein said each intersection being a 3-D position; and determine said height by taking a median of said 3-D positions and output a height of said structure based upon said 3-D positions.

18. A system as recited in claim 17, wherein said processing computer being further configured to compute said height of said structure using only a ground-sampling distance, an azimuth angle and an off-nadir angle from said metadata of said each image.

19. A system as recited in claim 18 wherein said metadata does not include calibration data of said camera.

20. A system as recited in claim 17 wherein said camera is located in a satellite, in an aircraft, in a drone, or in a balloon.

21. A system as recited in claim 17 wherein said first image is taken with a first camera and said second image is taken with a second camera.

22. A system as recited in claim 21 wherein said processing computer being further configured to determine said height by multiplying said median by a ground-sampling distance of said metadata.

23. A system as recited in claim 17, wherein said processing computer being further configured to compute said height using only a ground-sampling distance, an azimuth angle and an off-nadir angle from said metadata of said each image.

24. A system as recited in claim 23 wherein said metadata does not include calibration data of said camera.

25. A system as recited in claim 17 wherein said processing computer being further configured to determine the intersection of said 3-D vector only for those pairs of images points that correspond to a building footprint of said structure.

26. A system as recited in claim 17, wherein said processing computer being further configured to perform said steps of claim 16 for a plurality of structures in said images.

27. A system as recited in claim 17, wherein said processing computer being further configured to compute said plurality of pairs of coordinates of corresponding image points for all pixels in said images.

28. A system as recited in claim 17 wherein said metadata does not include calibration data of said camera, said processing computer being further configured to:

compute said height of said structure without using said calibration data.

29. A system as recited in claim 28 wherein said metadata only includes a ground-sampling distance, an azimuth angle and an off-nadir angle for said each image.

30. A system as recited in claim 17 wherein each of said images includes the same region on earth.

31. A system as recited in claim 17 wherein said first and second images overlap.

32. A system as recited in claim 17 wherein said processor being further configured to compute said three-dimensional (3-D) vector for said each image using metadata from an image pixel of said structure in said each image.

* * * * *

UNITED STATES PATENT AND TRADEMARK OFFICE
CERTIFICATE OF CORRECTION

| | | |
|---|---|---|
| PATENT NO. | : 11,776,148 B1 | Page 1 of 1 |
| APPLICATION NO. | : 18/107378 | |
| DATED | : October 3, 2023 | |
| INVENTOR(S) | : Poglitsch et al. | |

It is certified that error appears in the above-identified patent and that said Letters Patent is hereby corrected as shown below:

On the Title Page

REFERENCES CITED:
1. Page 2, Column 1, Item (56) under "Other Publications", Line 14, change "Consellation" to --Constellation--.

In the Drawings

1. Figure 9, and on the Title Page, the illustrative figure, second to the last line after the word Projected, change both instances of "rooftprint" to --roofprint--.

In the Specification

1. Column 8, Line 47, insert --.-- after --manner--.

In the Claims

1. In Line 11 of Claim 17 (Column 10, Line 57) change "toward d the" to --toward the--.

2. In Line 1 of Claim 22 (Column 11, Line 20) change "claim 21" to --claim 17--.

3. In Line 3 of Claim 26 (Column 12, Line 8) change "claim 16" to --claim 17--.

Signed and Sealed this
Twentieth Day of February, 2024

*Katherine Kelly Vidal*

Katherine Kelly Vidal
*Director of the United States Patent and Trademark Office*